United States Patent [19]
Ravencroft

[11] Patent Number: 6,155,000
[45] Date of Patent: Dec. 5, 2000

[54] RATTLE BAIT FISHING LURE

[76] Inventor: Gary N. Ravencroft, 5011 Ravelle Ct., Paradise, Calif. 95969

[21] Appl. No.: 09/431,597

[22] Filed: Nov. 1, 1999

Related U.S. Application Data

[60] Provisional application No. 60/106,723, Nov. 2, 1998.
[51] Int. Cl.$^7$ ................................................. A01K 85/01
[52] U.S. Cl. ........................................ 43/42.31; 43/42.13
[58] Field of Search .............................. 43/42.31, 42.13

[56] References Cited

U.S. PATENT DOCUMENTS

| | | | |
|---|---|---|---|
| 1,787,726 | 1/1931 | Heddon et al. | 43/42.13 |
| 3,848,353 | 11/1974 | McClellan | 43/42.31 |
| 4,619,068 | 10/1986 | Wotawa . | |
| 4,712,326 | 12/1987 | Hoover et al. | 43/42.31 |
| 4,745,700 | 5/1988 | Davis . | |
| 4,823,500 | 4/1989 | Shindeldecker | 43/42.13 |
| 4,930,247 | 6/1990 | DuBois . | |
| 5,024,019 | 6/1991 | Rust . | |
| 5,121,568 | 6/1992 | Lindmeyer | 43/42.31 |
| 5,144,765 | 9/1992 | Keeton | 43/42.31 |
| 5,201,784 | 4/1993 | McWilliams . | |
| 5,718,076 | 2/1998 | Wallrath | 43/42.13 |
| 5,822,912 | 10/1998 | Kato et al. | 43/42.22 |

Primary Examiner—Michael J. Carone
Assistant Examiner—Son T. Nguyen

[57] ABSTRACT

A snag-resistant or weedless fishing lure visually simulating two aquatic creatures swimming one above the other while emitting a fish attracting rattling sound. The lure comprising a lower weighted ballast aquatic creature body with hook, and an upper symmetrically shaped rattle body resembling a baitfish and which includes at least one rattle chamber containing shot or rattle members. The lure bodies are attached to a "V" wire harness to which a fishing line is attached, the attachment of the rattle body includes the use of anti-spin structuring preventing spinning but allowing side to side swinging. As the lure is pulled through the water, the rattle body moves in a side to side swinging motion causing the rattle member(s) to impact the walls defining the chamber and make vibration detectable by fish. In a preferred embodiment, a floor (or floors) in the rattle chamber on which the shot or rattle member(s) slide or roll, is sloped, sloping from a lower position nearer the front end of the body or chamber to a higher position nearer the back of the rattle body or chamber. The sloped floor counters the effects of force which tend to push and hold the shot or rattle members toward the chamber back end, the pushing effect of the force is counteracted by the rattle chamber sloped floor to allow a more free back and forth movement of the rattle members and thus improved overall rattling of the lure.

2 Claims, 7 Drawing Sheets

RATTLE BAIT FISHING LURE

A priority claim is hereby made to my pending U.S. Provisional Application for Patent Ser. No. 60/106,723 filed Nov. 2, 1998.

BACKGROUND OF THE INVENTION

1. Field of the Invention

The present invention relates to fishing lures of the type which rattle or otherwise make noise when drawn through the water to attract fish.

2. Description of the Related Prior Art

In the prior art exist fishing lures visually simulating fish or aquatic creatures and including internal chambers holding loose rattle members which impact the walls defining the chamber and produce fish attracting noise or vibration commonly referred to as rattling. Prior art artificial lures commonly known as crank bait and simulating a single swimming fish or aquatic creature and which have rattling capabilities have been used for years in the U.S. and can be purchased in numerous styles in most all fishing supply stores or catalogs.

Spin or spinning herein means or defines rotating in full 360 degree circles, typically in a single direction. A spinner or spinner blade herein means that part of a fishing lure which spins in 360 degree circles when pulled through the water. The present invention, as will become appreciated, preferably does not include a spinner, so as to eliminate the troubles associated therewith.

In the prior art exist fishing lures including spinning blades or spinners which are fish attractants but which have many shortcomings and create problems in certain situations.

When casting, the typically thin, lightweight blades tend to catch the wind and hamper both distance and accuracy of the cast lure. When being pulled through most any type of vegetation, i.e. underwater grasses, moss, millfoil, etc, the spinning blades tend to wrap up and get fouled within the vegetation which immediately imparts the lure useless until retrieved and cleaned. Oftentimes the best fishing is in such vegetation. Even a small piece of grass or vegetation caught at the swivel or on the spinner blade can completely prevent the blade from spinning, and since the lure is designed to attract fish based on the spinning and flashing action of the spinner blade, the lure is substantially reduced in fish attracting capabilities when the spinner blade is jammed. This is not to say that lures that do not incorporate spinners are not effective in attracting fish, but rather, spinner lures when jammed with vegetation simply do not properly simulate an aquatic creature which a game fish may wish to eat. Spinners are normally not associated with "snagless" type fishing lures, although snagless style hooks have in the prior art been associated with spinners, but such snagless hooks do not aid in preventing the spinner from becoming jammed by vegetation.

In the prior art, some attempts have been made to associate rattling with spinners or spinner blade possessing lures using rattle pods, clackers or spinner blades with internal rattle chambers. Locating rattle members loosely within a hollow spinning or rotating spinner is a far less than optimal arrangement because a spinning motion produces centrifugal force sufficient to stop or reduce the rattling sound, and this due to centrifugal force jamming the rattle member(s) tightly against an outer wall during high force, assuming vegetation hasn't jammed the spinner rendering it completely ineffective as above mentioned.

Weighted "jig" type artificial crank baits are well known in the prior art, and simulate an aquatic creature or fish.

Also known in the prior art are artificial crank baits which combine weighted body "jigs" connected with resilient V-wire to spinners, and in some cases spinners having rattle capabilities either built into a hollow chamber within the spinner itself, or located directly in front of or behind the spinner blade and relying on the vibration of the spinner to shake the rattle members to produce rattling. In either case, the spinner must be free or un-jammed to produce any significant rattling.

Patented fishing lures of which I am aware and which I consider similar to my invention yet including significant shortcomings are exemplified in the following U.S. Patents.

U.S. Pat. No. 4,930,247 issued Jun. 5, 1990 for a fishing lure spinner blade with rattle chamber within the spinner blade.

U.S. Pat. No. 5,024,019 issued Jun. 18, 1991 for a spinner bait lure with rattle pod attached in front of a spinner blade and relying on the spinner blade to create shaking or vibration for causing rattling.

U.S. Pat. No. 4,745,700 issued May 24, 1988 for a fishing lure having a buoyant hollow blade-like asymmetrical member connected to the balance of the lure with a swivel connecter allowing 360 degree spinning to allow the buoyant member to rotate and gyrate when pulled through the water. The rotating and gyrating buoyant member of U.S. Pat. No. 4,745,700 has an internal chamber containing loose shot to make rattling noise. Because of the use of the swivel connecter and the references to rotation, the buoyant member having the rattle members appears to spins 360 degrees in a single direction when the lure is retrieved at a fairly constant speed or when "ripped" through the water. "Ripped" as known to fishermen, is a fast jerk of the line and thus lure for a short distance followed by a significant slowing, and this to present a darting baitfish image or action which tends to excite game fish. Ideally, in my opinion, a lure would produce a great amount of rattling when repetitiously ripped through the water, so that the very fast visually noticeable motion associated with ripping not only catches the fish's eye, but is enhanced in its "strike encouraging effect" by a good amount of loud rattling associated with each rip. It is believed that the rotating buoyant member with rattle members of U.S. Pat. No. 4,745,700 would spin in 360 degree fashion so fast during a rip that little if any rattling would occur due to centrifugal force brought about by the rapid acceleration associated with a rip. Some rattling would occur in the lure of U.S. Pat. No. 4,745,700 when the lure slowed and the shot settled to the bottom end of the rattle chamber, but I believe such rattling would be insignificant and would not be occurring at the optimal time.

U.S. Pat. No. 5,201,784 issued Apr. 13, 1993 for a spinner bait fishing lure having a rattle mounted within a carriage such that when an attached spinner blade spins, the carriage is reciprocated to cause a rattling sound.

U.S. Pat. No. 4,619,068 issued Oct. 28, 1986 for a spinner bait fishing lure having a rattle housing mounted in front of a spinner blade such that when the spinner blade spins, the rattle housing is moved to cause a rattling sound.

It should be noted that all five of the above patented prior art lures include many common features to one another. Furthermore, a review of the prior art makes is abundantly clear that the field is crowded and that what might seemingly be a minor structural change to one of ordinary skill may actually constitute a valuable and needed advancement in the field and quite worthy of patent grant thereon.

SUMMARY OF THE INVENTION

My invention is a fishing lure visually attractive to game fish and preferably visually simulating two (or more) aquatic creatures such as baitfish swimming adjacent or one above the other while emitting a fish attracting rattling sound. A lure in accordance with the invention comprising a lower weighted ballast aquatic creature body with hook, and an upper rattle body preferably resembling a baitfish and which includes at least one rattle chamber containing one or more shot or rattle members. The rattle body may also include a hook. The lure bodies are attached to a "V" wire harness to which a fishing line is attached, the attachment of the rattle body includes the use of anti-spin structuring preventing spinning of the rattle body relative to the wire and lower weighted body but allowing side to side pivoting or swinging of the rattle body preferably in a single plane which is preferably approximately horizontal and resembling a darting baitfish. As the lure is pulled through the water, the rattle body moves in a side to side swinging motion causing the rattle member(s) to impact the walls (sidewalls) defining the chamber and make noise audible to fish. A floor (or floors) in the rattle chamber on which the shot or rattle member(s) slide or roll, is preferably (but not required) sloped upward, sloping from a lower position nearer the front end of the body or chamber to a higher position nearer the back of the rattle body or chamber. The sloped floor counters the effects of force ("G" or centrifugal force) from acceleration which tend to push and hold the shot or rattle members toward the chamber back end, the pushing effect of the force is counteracted by the rattle chamber sloped floor to help prevent the rattle members from becoming jammed or stationary against the chamber back wall, thus allowing a more free back and forth movement of the rattle members and thus improved overall rattling of the lure.

The floor or baffle floor portion in the rattle chamber of the rattle body can include multiple differing slopes. In one embodiment of the lue, the sloped floor includes differently sloped areas or different degrees of slope to provide different levels of the force countering effect to a given single rattle member or group of rattle members. These differently sloped areas are useful because the amount of force applied to the rattle members throwing them toward the rear end of the rattle chamber is related to rate of acceleration of the lure such as when ripped forward by the fisherman, or the rate of back and forth swinging movement as the rattle body simulates a swimming fish. Therefore in this embodiment, a low floor slope is used when the rattle members are under low rearward force, and a higher or more steeply sloped floor is used when the rattle members are under a higher rearward force, and preferably the rattle members, which are preferably round shot of lead, can move (roll or slide) under the rearward pushing force (or holding force as the body moves) from the low sloped floor to the higher sloped floor simply with an acceleration of the movement of the lure, and thereby maximum rattle sound is automatically achieved in a lure in accordance with the present invention. While one slope can be used, two, three or more slopes or a curved floor (radius) can be used in a single rattle chamber.

The hook of the weighted lower aquatic body is positioned to be behind the "V" wire so as to be protected against weeds, snags and the like, and the hook of the rattle body if used is also positioned to be behind the "V" wire harness and thus protected against snags. Therefore, the present fishing lure in a preferred embodiment can be considered to be of the snagless or weedless type.

The present preferred lure is made without any rotating spinners or spinner blades or the like which can adversely effect casting and can become entangled in vegetation, or in the least my lure is not reliant on a spinner. I am anticipating someone in the future attaching an "inconsequential spinner" to my lure, such as a very small one and/or carefully located one so as to not cause significant adverse effects to the overall lure functionality when the spinner becomes jammed with vegetation, this "inconsequential spinner" added to what is in effect my invention will be considered within the scope of the present invention.

The present fishing lure continues its fish attracting qualities, i.e., both visually and audibly, when pulled through vegetation, bumped into any obstruction, when ripped or slowed during the retrieve or at a constant speed of retrieval. The present lure can be cast and retrieved or trolled behind a boat.

BRIEF DESCRIPTION OF THE DRAWINGS

FIG. 7 is a view of both the left body half and mating right body half of a rattle body having multiple rattle chambers each with round shot rattle members placed in one half in preparation of mating and affixing the two body halves to one another with heat bonding, sonic welding or adhesives or the like.

DESCRIPTION OF THE PREFERRED EMBODIMENTS

Figure 1:
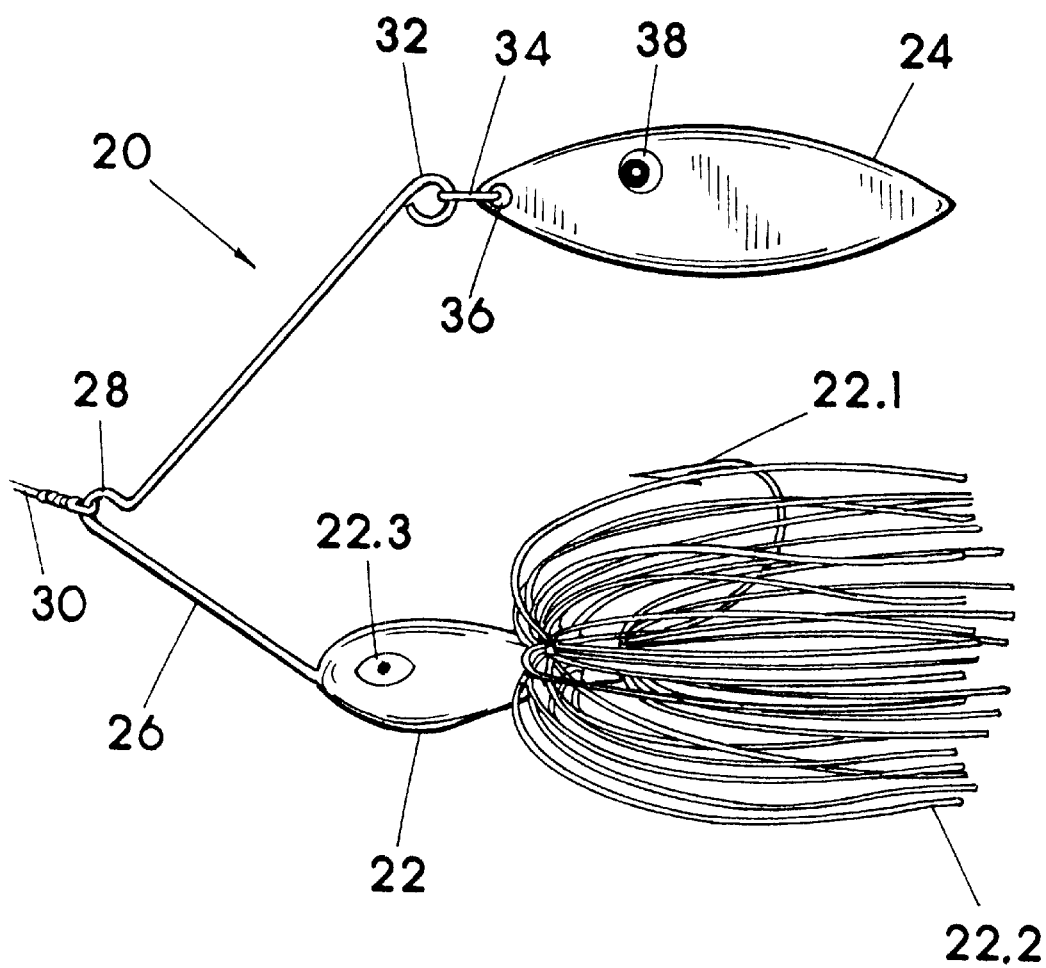
FIG. 1 is a left side view of a preferred embodiment in accordance with my invention and attached to a fishing line. A right side view of this preferred embodiment appears as a mirror image of the left side view.
Figure 2:
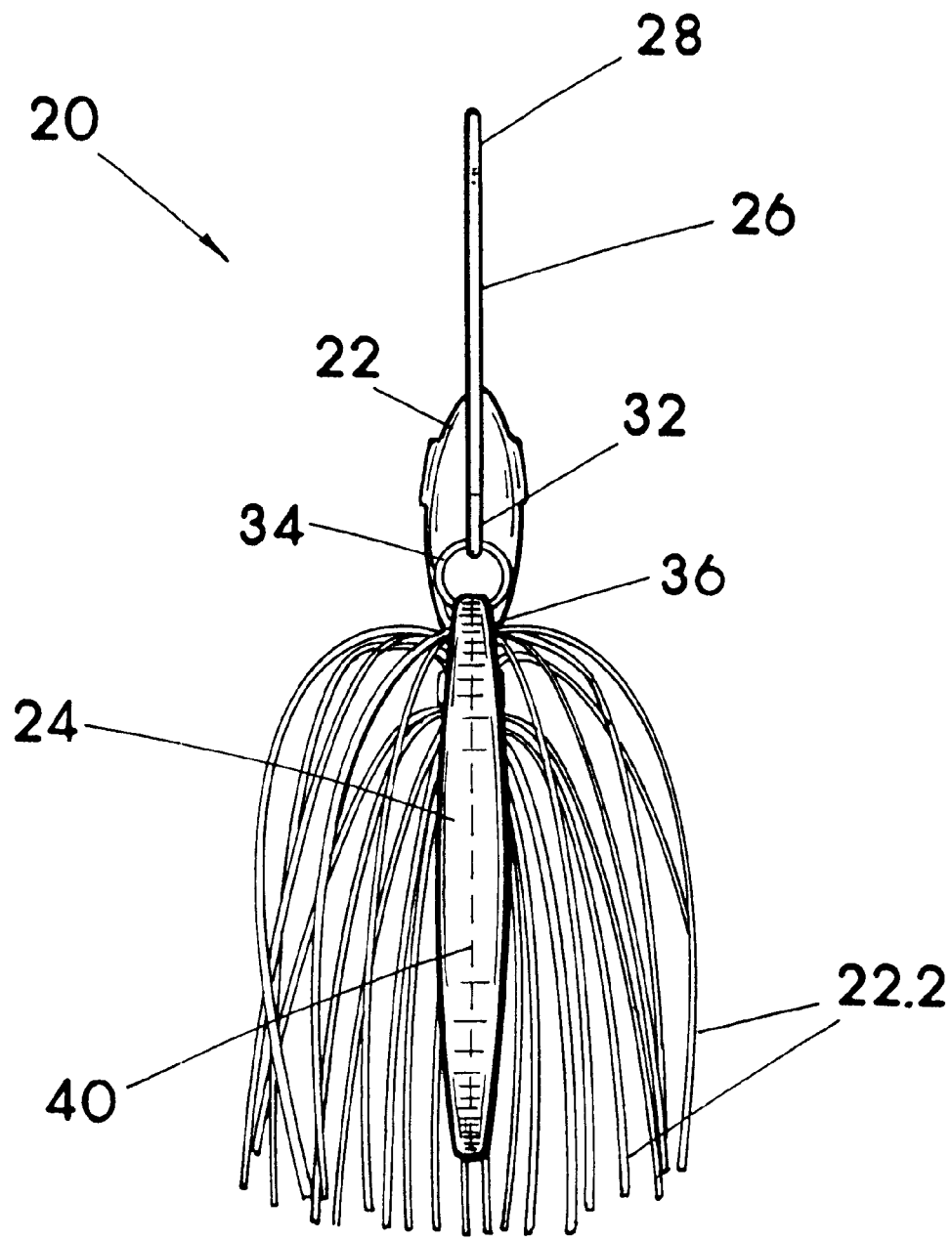
FIG. 2 is a top view of the FIG. 1 embodiment.
Figure 10:
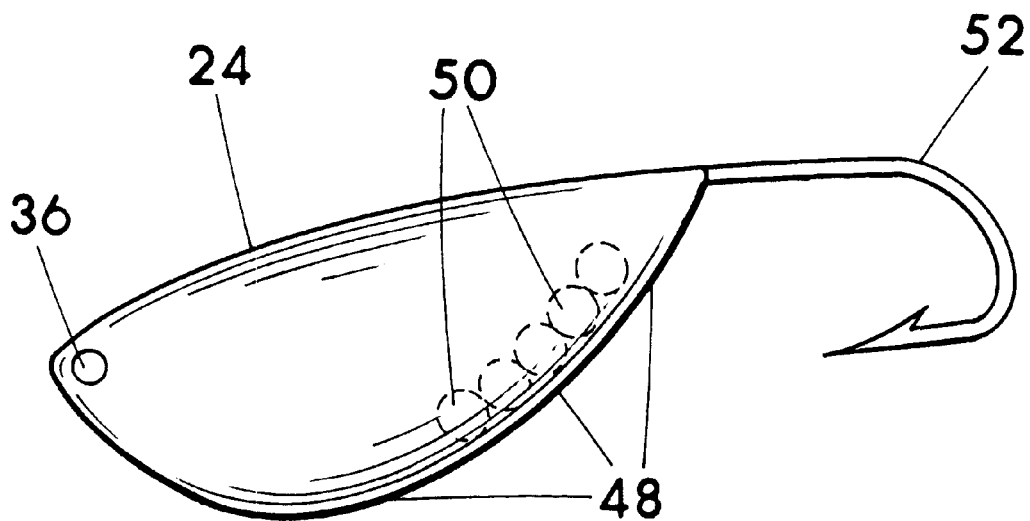
FIG. 10 is a left side view of a rattle body with snag-less positioned hook having one rattle chamber with round shot rattle members indicated in broken lines therein.

Keeping the above in mind, I will now provide a more detailed description of embodiments in accordance with the invention with reference to the drawings wherein reference numerals have been applied. The components or features associated with the reference numerals in the drawings will in some cases be more fully described below, but in brief represent the following:

20 is the lure as a whole shown in FIG. 1 or otherwise in accordance with the invention; 22 is the weighted body shown in FIG. 1 as a jig like structure; 22.1 is the fish hook on weighted body; 22.2 is the flexible skirting on weighted body 22; 22.3 are the simulated eyes on weighted body 22; 24 is the upper rattle body (second aquatic creature), shown in FIG. 1 as a willow leaf shaped baitfish and shown in many other views in whole or in half in different shapes; 26 is the "V" wire or resilient wire connecting component between the two main body members 22 and 24; 28 is a bend or curvature in "V" wire 26 to which to attach fishing line; 30 is a fishing line; 32 is an eye or loop in "V" wire 26; 34 is a ring or split ring; 36 is a front hole or attachment hole in rattle body 24;

38 are simulated eyes on rattle body 24; 40 represents a seam between mating body portions or halves shown in broken line in FIG. 2; 42 is walling or walling material of rattle body 24 also defining attachable edge walls as in FIGS. 3–8 and the rattle chamber sidewalls and in some case floors and ceilings; 44 is a hollow or rattle chamber in rattle body 24; 46 is a baffle or divider between rattle chambers 44; 48 is flooring or surfacing on which rattle members 50 can roll or slide; 50 is a rattle member or rattle members loose in rattle chambers 44; 52 is a fish hook (optional) on any rattle body 24 but shown in FIG. 10.

The details regarding the preferred embodiments herein provided in the specification (Summary, drawings and descriptions thereof, and in this Detailed section) are to exemplify and expand upon the scope of the invention and individual features thereof, and are generally not intended to be limiting except where it is quite clear a limitation is being described or detailed. It is clearly evident the invention can be structured in many different arrangements within the true scope of the invention as recited in the claims.

FIG. 1 is a left side view of lure 20, a preferred embodiment in accordance with my invention, and attached to a fishing line 30. Any of the other rattle body 24 shapes indicated in the drawings such as in FIGS. 2–10 can replace the willow leaf shaped body 24 of FIGS. 1–2 within the scope of the invention. A right side view of this preferred embodiment in FIG. 1, as well as other embodiments fashioned from the other herein anticipated shaped rattle bodies 24, appears or preferably appears as a mirror image of the left side view. Shown is weighted body member 22 which is the lower body when the preferred lure is in use in water being retrieved, and can be basically a lead-headed jig structure (but is not required to be such) having a fish hook 22.1, flexible skirting 22.2, simulated eyes 22.3 and intended to appear to a game fish as an aquatic creature, such as a baitfish, bug or the like, which the game fish hopefully will want to eat or strike such as in defense of a nest or eggs. The first or weighted body member 22 is weighted or heavy enough to sink in water and preferably to sink the entire lure 20 in water so that the lure can be fished near the bottom when desired, and or cast a substantial distance. Body member 22 can be made of lead or other suitably heavy material (iron, steel, etc.) having one end of wire 26 embedded therein or otherwise attached, preferably (not required) so that body member 22 is stationary on wire 26. The first or weighted body member 22 can have rattling capabilities internal or attached external such as with a rattle pod, and body member 22 can be attached to pivot but not spin relative to wire 26. Skirting 22.2 is preferred for appearance and for hiding hook 22.1, and can be attached such as with a rubber band or any other suitable arrangement, but is not always required. Body member 22 is not required to have eyes 22.3 or the other visual features which could be applied, but such features in many case are preferred, and such features can be made or applied through any suitable arrangement, i.e., painting, dipping, rubber coating, integral molding, metal coating, decals, reflective diamond like patterns molded into the sides and with reflective surfaces applied through any suitable processes, etc., to have any appearance enticing or possibly enticing to a game fish. The open portion of hook 22.1 (and hook 52 also if used) is preferably positioned, as shown in FIG. 1, upward and behind (or downward and behind for hook 52) in spaced relationship to wire 26 so that weeds and limbs and the like snags are themselves deflected to the side by wire 26 or the lure 20 is deflected, and thus is rendered a snaggless or weedless type lure. Fish such as bass usually strike from behind and below, and thus will usually bite and get hooked on hook 22.1 before reaching the upper rattle body 24, however rattle body 24 can if desired also be equipped with an exposed fish hook pointing down as indicated in FIG. 10 at 52, particulary if the body members 22 and 24 are to travel side by side when pulled through the water as opposed to my preferred rattle body 24 positioned vertically over weighted body 22.

Wire 26 may be or is structured the same or similar to "V" wires commonly used in the prior art and can be called a "V" wire or wire harness or "V" wire harness, and is a metal wire, preferably of resilient material, to which a metal or lead-head or other otherwise weighted first body member 22 can be attached such as by directly casting (molding) for example only. The resiliency of wire 26, which is highly preferred but not required, serves to maintain the upper and lower or first and second body members 22 and 24, i.e., weighted body member 22 and rattle body 24, in spaced yet adjacent relationship even if a limb, rock or large fish momentarily push or pull the body members 22 and 24 toward or away from one another. Wire 26 preferably includes a bend 28 or series of bends (curves) preferably defining an apex at the forward most portion of lure 20 to which to attach a fishing line 30 such as by direct tying as shown in FIG. 1 wherein the fishing line 30 will have a tendency to stay in the apex to maintain a proper angle upon which to pull the lure 20 through the water. Lure 20 in FIG. 1 is considered to be submerged in water.

Figure 11:
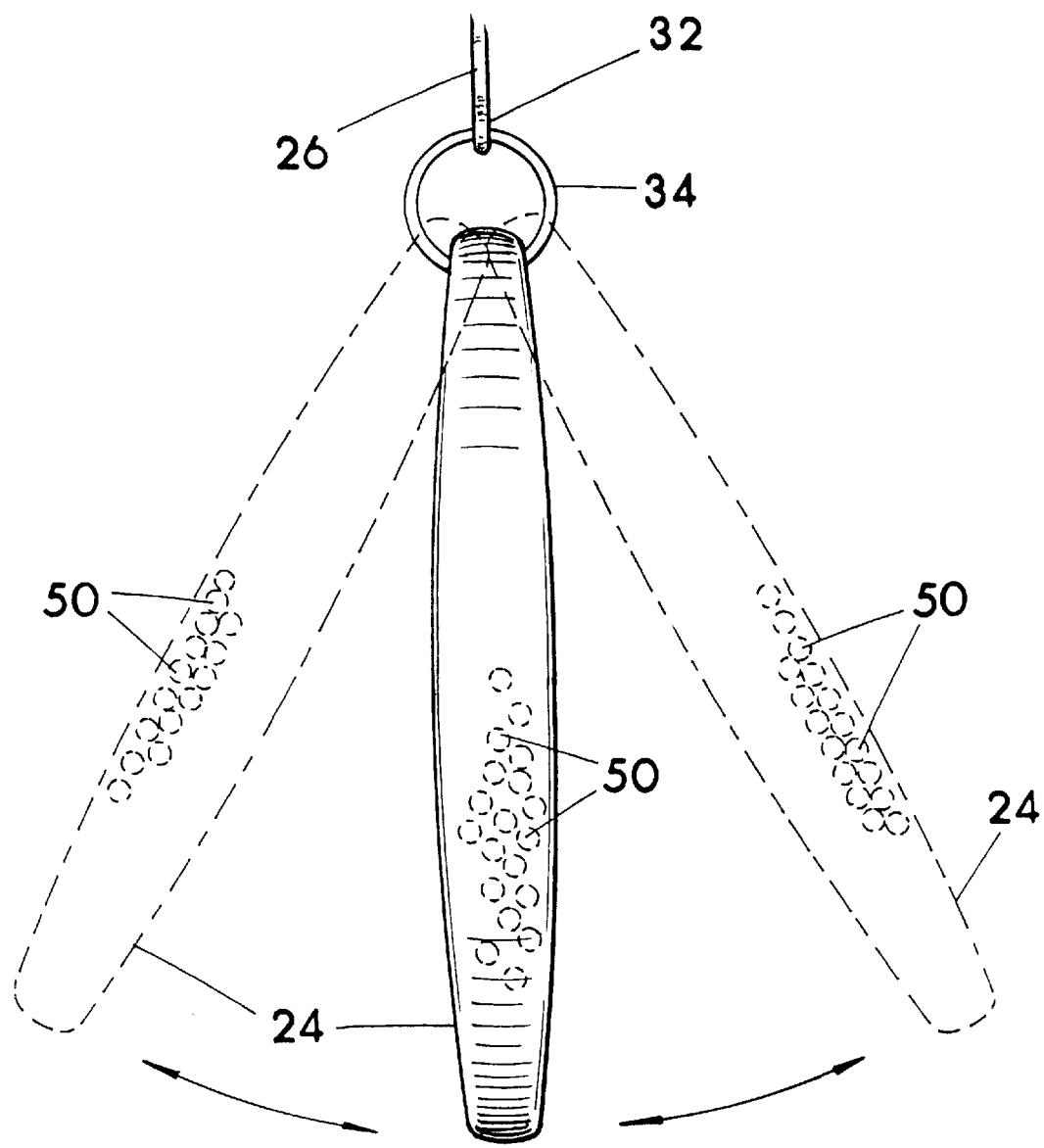
FIG. 11 is an illustration showing the side to side swinging motion of the rattle body when pulled through water. The lower positioned jig or weighted body is not shown in this view for clarity of that which is shown. Rattle members are indicated in broken lines.
Figure 12:
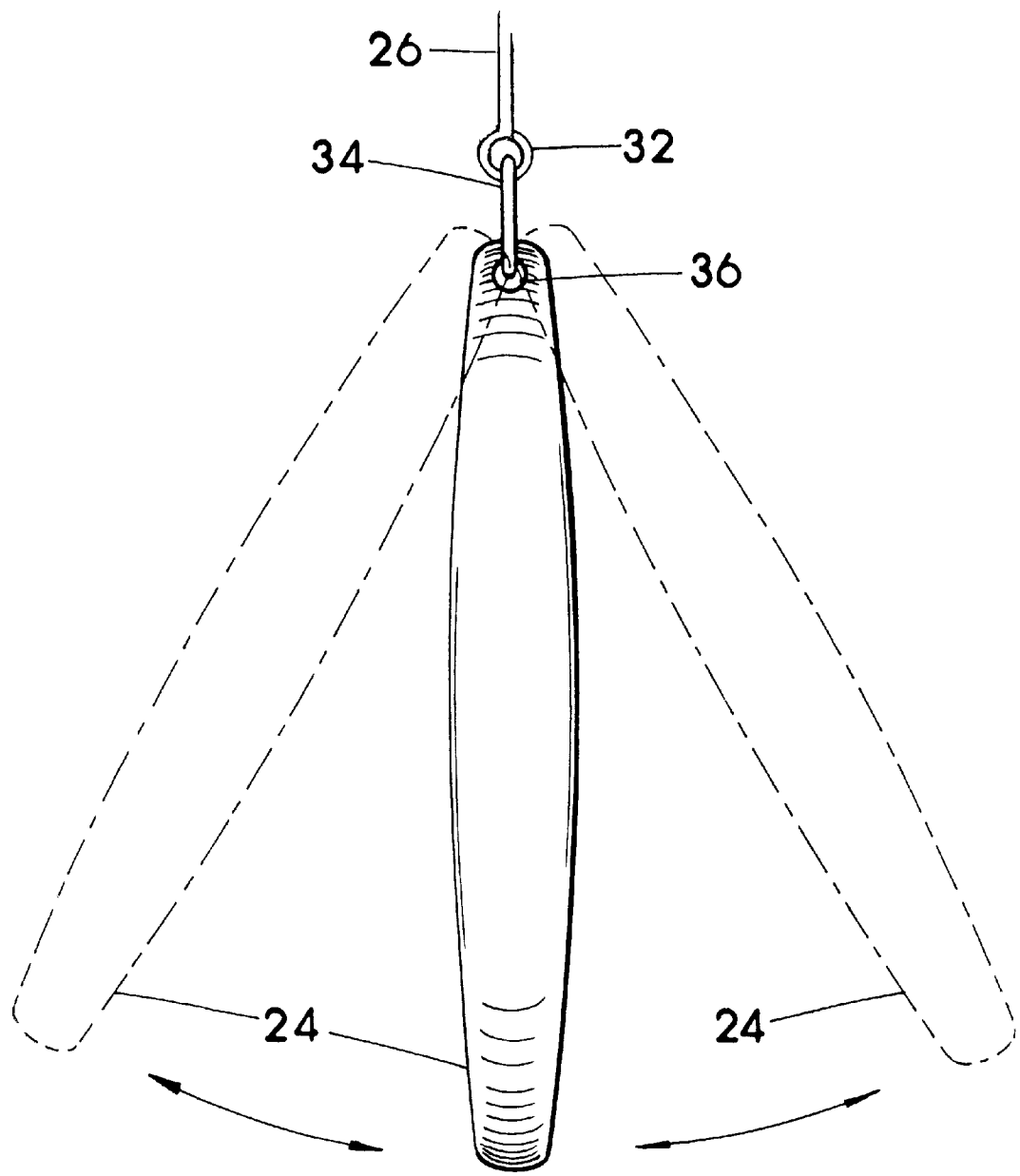
FIG. 12 is an illustration showing the side to side swinging motion of the rattle body when pulled through water. The lower positioned jig or weighted body is not shown in this view for clarity of that which is shown. This view differs primarily from the FIG. 11 view at the connection of the rattle body to the "V" wire and in the orientation of loops and rings and hole providing connection and prohibiting spinning of the rattle body.

The upper end of wire 26 as shown in FIG. 1 is connected indirectly or directly to rattle body 24 in a connection which prevents spinning (360 degree as defined above) of rattle body 24 but allows pivoting or swinging of the body 24 in a side to side motion basically hinged at the forward end to the adjacent end of wire 26 wherein the swinging is with the rattle body 24 preferably in a single plane, for example, a horizontal plane. I prefer rattle body 24 to be indirectly attached to wire 26 as shown in FIG. 1 wherein a loop 32 is formed in the wire 26 end, a ring 34 such as a split ring is passed through and thus retained through loop 32, and split ring 34 is additionally passed through a hole 36 through the front end or nose of rattle body 24, an arrangement which attaches rattle body 24 to the adjacent end of wire 26, albeit indirectly, and in a hinge like manner or pivotal connection which clearly prevents spinning of the rattle body 24 relative to the wire 26 and or weighted body 22. The hole 26 is preferably loose fit about ring 34. FIG. 2 and 11 show this just previously detailed connection arrangement from a top view. FIG. 12 shows the loop 32 positioned horizontally as opposed to vertically as in FIG. 1, and ring 34 is positioned vertically in FIG. 12 as opposed to horizontally as in FIG. 1, and hole 36 is positioned vertically extending through body 24 in FIG. 12 as opposed to horizontally as in FIG. 1, and either arrangement will function properly, as would the direct placing of loop 32 through a hole 36, although sans the additional ring 34, it would generally not be as free to swing back and forth, as ring 34 renders it less likely to bind. The use of a split ring 34 allows the ready removal of rattle body 24 for whatever reason, such as to replace it with a rattle body 24 of another shape or style, such as one of the other rattle body styles shown in FIGS. 3–10 for example only.

Rattle body 24 of FIG. 1 is elongate and symmetrical in exterior shape, and this shape as well as others including those shown in my drawings all of which are preferably symmetrical can be used and can have numerous or many different external appearance. Body member 24 is not required to have eyes 38 or the other visual features which could be applied, although in most cases visual features such as eyes, colors, reflective surfaces, etc, are preferred and can be applied through any suitable arrangement, i.e., painting, dipping, rubber coating, integral molding, metal coating, decals, diamond like patterns molded-in and metal coating or the like to have reflective surfaces, etc., to have any appearance enticing or possibly enticing to a game fish. The preferred elongate and symmetrical shape, as well as proper weight distribution, i.e., greater weight toward the rear end rather than toward the front end at least during a given rate of acceleration, in combination with the proper pivotal connection to wire 26 as above described, allow or cause rattle body 24 to swing or pivot back and forth when pulled through water, as shown in FIGS. 11–12.

FIG. 2 is a top view of the FIG. 1 embodiment.

Figure 3:
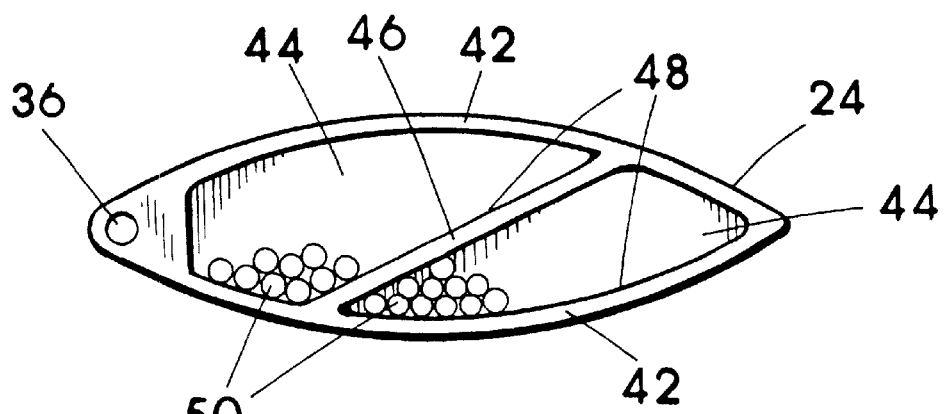
FIG. 3 is a view into the interior of the right half of a two piece or two half body of the rattle body of the FIG. 1 embodiment.
Figure 5:
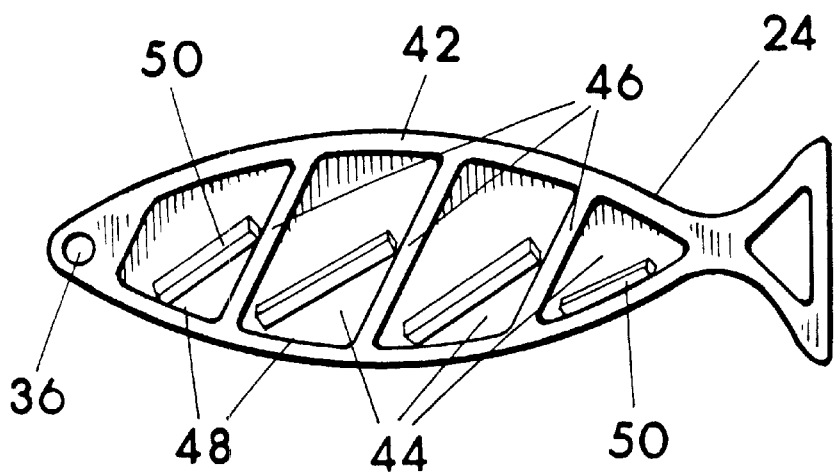
FIG. 5 is a view into the right half of a rattle body having multiple rattle chambers, rectangular in shape and having bar or rectangular shaped rattle members therein.

FIG. 3 is a view into the right half of a two piece or two half body of the rattle body 24, such as the body 24 of the FIG. 1 embodiment. While rattle bodies used for prior art fishing lures are not required to be made in two major portions or halves, such is a known way useful with the present invention which allows the ready placement of rattle members 50 into a rattle chamber 44 area (chamber 44 is a hollow area inside rattle body 24) followed by adhering the left and right body halves together (see FIG. 7 for a left and mating right body portion) using heat bonding, glue, snap fit or any other suitable arrangement which is suitable for the material from which body 24 is manufactured. Other arrangements such as making rattle body 24 of generally one piece with a plugged or plugable hole allowing insertion through the unplugged hole of rattle member(s) 50 would also be acceptable. The body of rattle body 24 can be made of numerous materials within the scope of the invention, including plastics, metal, wood, glass, etc. Metal is quite feasible, although plastics when used in injection molding can produce a very inexpensive body. For improved rattling, hard materials such as a hard plastic should be used to define rattle body 24 although widely varying degrees of hardness in the materials will produce rattling or vibration detectable by fish and thus acceptable in the invention, and differing combinations of hardness of the body 24 sidewalls and the rattle members 50 also render differing rattling effects. Rattle body 24 defines sidewalls, a ceiling, flooring and end walls or the like bounding items in sufficient spaced relationship to define a hollow herein referred to as the rattle chamber 44, and rattle body 24 may have more than one interior rattle chamber 44. The rattle chamber 44 is for containing the rattle members 50, one member 50 is within the scope of the invention but I prefer multiple rattle members 50 in a chamber 44. The rattle members 50 are preferably round or balls so as to roll on flooring of the chamber 44, but can be any shape including rectangular as shown in FIG. 5 which will impact an adjacent chamber 44 bounding wall and create or assist in creating a rattling or vibration which is in effect transmitted outward from the lure 20 through the water to be detected by game fish. With the side to side pivoting action of rattle body 24 during use, the rattle members 50 as may be ascertained from FIG. 11 will impact the sidewalls of the chamber 44, these sidewalls are the interior sides of the exterior sidewalls of the body 24 and thus will transmit the rattle or vibration quite well.

Figure 7:
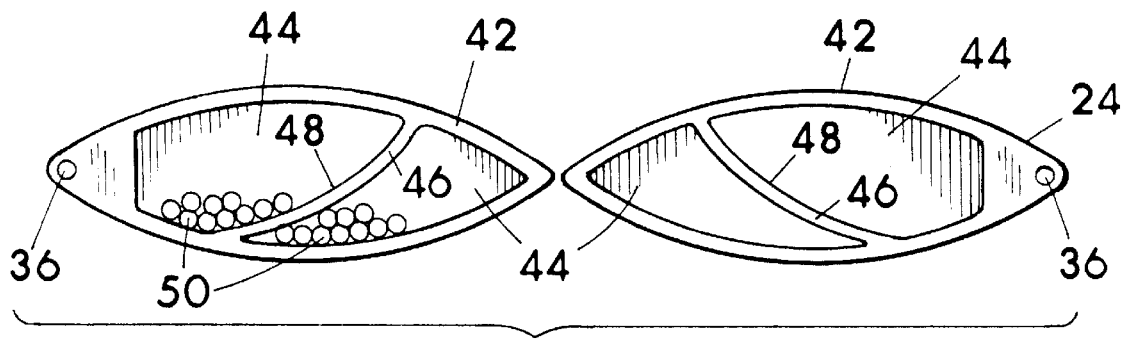

Baffles 46 can be applied inside rattle body 24 to define or create multiple rattle chambers 44, the baffles 46 can be made the full chamber transverse width defined in one body half or portion in manufacturing, or the baffles 46 can be divided in the manufacturing stage, for example one-half of the baffle in one body section, and the other and mateable baffle one-half in the other body section or half, as can be ascertained from FIG. 7 wherein when the left and right body portions are mated, a single baffle 46 structure is in effect defined. Mated baffle sections are not required to be adhered together in the chamber 44.

Figure 4:
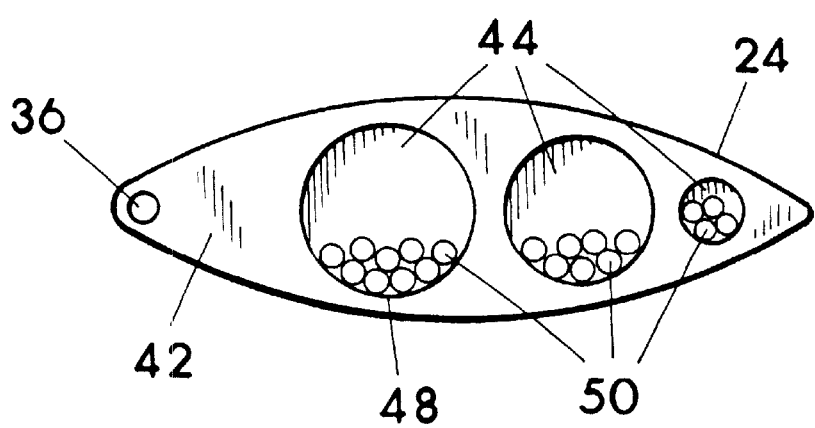
FIG. 4 is a view into the right half of a rattle body having multiple circular rattle chambers each with round shot rattle members therein.

FIG. 4 is a view into the right half of a rattle body 24 having multiple circular rattle chambers 44 each with round shot rattle members 50 therein.

FIG. 5 is a view into the right half of a rattle body 24 having multiple rattle chambers 44, rectangular in shape and having bar or rectangular shaped rattle members 50 therein.

Figure 6:
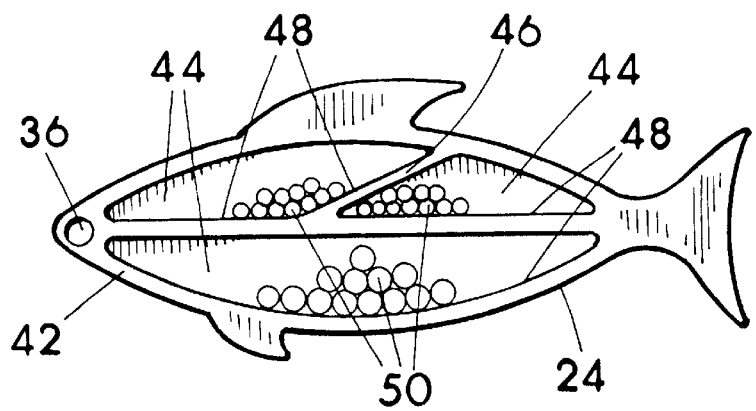
FIG. 6 is a view into the right half of a rattle body having multiple rattle chambers each with round shot rattle members.

FIG. 6 is a view into the right half of a rattle body 24 having multiple rattle chambers 44 each with round shot rattle members 50.

FIG. 7 is a view of both the left body half and mating right body half of a rattle body 24 having multiple rattle chambers 44 each with round shot rattle members 50 placed in one half or portion in preparation of mating and affixing the two body halves to one another with heat bonding, sonic welding or adhesives or the like. Body "halves" of body 24 which are equal in depth are not a requirement of the invention, in that one body portion could be deep enough to define the full transverse width of chamber(s) 44 with the other mateable body portion basically being a plate mateable and attachable to the first full depth body portion, for example, after the shot 50 have been installed in the deep portion.

Figure 8:
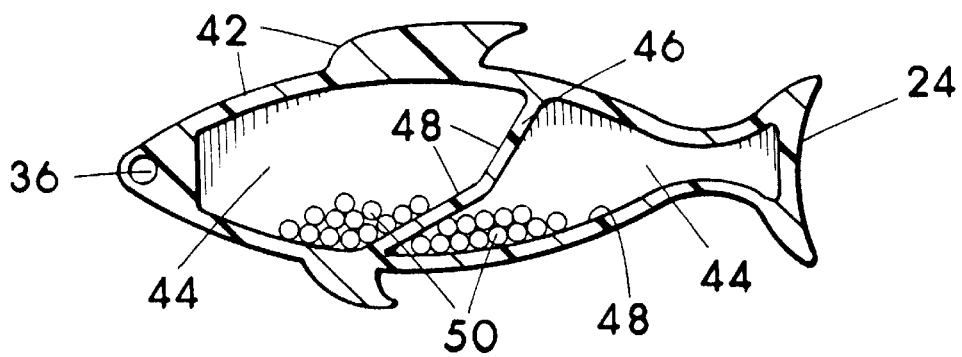
FIG. 8 is a view into the right half of a rattle body having multiple rattle chambers each with round shot rattle members.

FIG. 8 is a view into the right half of a rattle body 24 having multiple rattle chambers 44 each with round shot rattle members 50.

Figure 9:
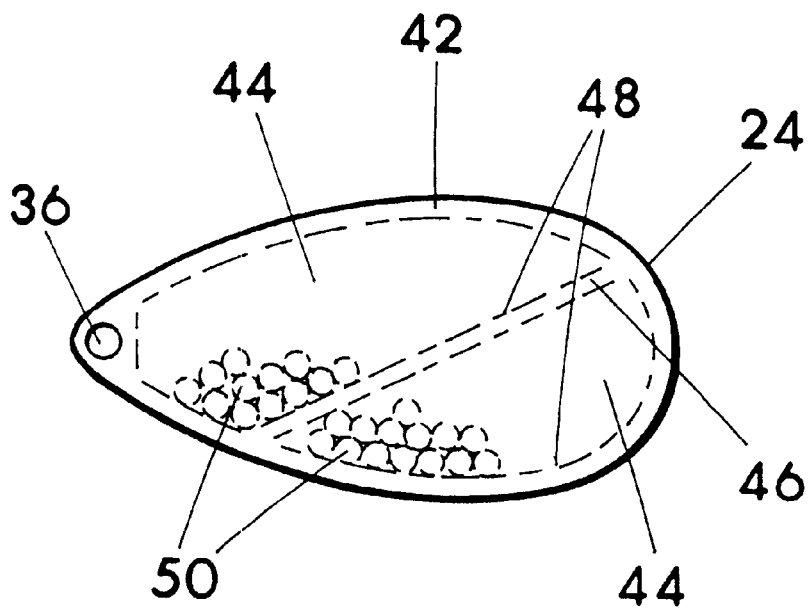
FIG. 9 is a left side view of a rattle body having multiple rattle chambers each with round shot rattle members therein.

FIG. 9 is a left side view of a rattle body 24 having multiple rattle chambers 44 each with round shot rattle members 50 therein shown in broken lines. Also shown in Broken lines is a baffle 46.

FIG. 10 is a left side view of a rattle body 24 with snag-less positioned hook having one rattle chamber 44 with round shot rattle members 50 indicated in broken lines therein. The rattle chamber 44 is indicated as having a rear upwardly sloping floor 48.

FIG. 11 is an illustration showing the side to side swinging motion of the (any of the) rattle body 24 when pulled through water. The lower positioned jig or weighted body 22 is not shown in this view for clarity of that which is shown. Rattle members 50 are indicated in broken lines.

FIG. 12 is an illustration showing the side to side swinging motion of the (any of the) rattle body 24 when pulled through water. The lower positioned jig or weighted body 22 is not shown in this view for clarity of that which is shown. This view differs primarily from the FIG. 11 view at the connection of the rattle body 24 to the "V" wire 26 and in the orientation of loop 32 and ring 34 and hole 36 providing connection and prohibiting spinning of the rattle body 24.

From the drawings it is evident that various sizes nd shapes of rattle member 50 can be used. In FIG. 3 two sizes of round shot rattle members 50 are shown; FIG. 5 bar type rattle members 50 are shown; in FIG. 6 three rattle chambers 44 are shown, two of which have the same size of round shot rattle members 50 and the lower chamber has larger round shot members 50. FIG. 10 shows very large round shot rattle members 50. Round and non-round rattle members can be used in the same rattle body 24 and further in the same chamber 44 is desired. If a pivotally mounted rattle member 50 is located in a chamber 44 and swings back and forth or remains relatively stationary as the body 24 swings back and forth and rattling is created through whatever arrangement, then this too would be acceptable within the scope of the invention. The amount of shot or rattle members 50 can be adjusted to make the rattle body buoyant, zero-buoyancy or sinking. The rattle members 50 can be of any suitable material including but not limited to steel, lead, glass, wood, ceramic, plastics or whatever seem to function well and be cost effective to employ.

The rattle body 24 can be almost flat-sided, sightly rounded, round or oval when viewed from either end. The rattle body 24 exterior surface can be anything from smooth to heavily textured and could have a fish scale pattern. The surface could be chromed in silver or gold or be painted to represent any number of baitfish.

In use, the lure is connected to a fishing line, cast and retrieved at various speeds and at various depths to simulate two baitfish or aquatic creatures swimming one above the other. Different speeds of retrieve imparts many different clicking and rattling sounds emitted from the rattle chambers. Bumping the lure into various obstructions, i.e. dock posts, trees, rocks, etc. creates a louder and more distinct fish attracting sound. Another proven method using this lure is to "wake" it just under the surface to simulate a baitfish swimming just under the surface fleeing from predators. This is accomplished by holding the fishing rod tip high in the air and reeling fast, keeping the lure wobbling just under the surface, creating a "wake". Ripping of the lure as above described can also be very effective fishing the lure, as well as with high speed retrieval followed by a dramatic slowing in retrieval. These techniques apply varying force of acceleration with both the forward motion acceleration associated with a rip, and with the acceleration associated with the continuous stopping (deceleration) to one side and beginning movement acceleration in the other direction to only then stop at the other side and then accelerate in the opposite direction, as occurs with the back and forth swinging of rattle body 24 when pulled through water. Flooring 48 in the rattle chamber 44 on which the shot or rattle member(s) 50 slide or roll across, is preferably sloped upward, sloping from a lower position nearer the front end of the body 24 or chamber 44 to a higher position nearer the back of the rattle body or chamber. Flooring 48 has transverse width wider than the rattle members 50 to allow side to side movement of the members 50 within chamber 44 and thus the impacting of the opposite sidewalls of the body 24. The sloped floor or floors counters the effects of force ("G" or centrifugal force) from acceleration which tend to push and hold the shot or rattle members 50 toward the chamber 44 back end, the pushing effect of the force is at least to a degree counteracted by the rattle chamber 44 sloped floor 48 to help prevent the rattle members 50 from becoming jammed or stationary against the chamber back wall, thus allowing a more free back and forth movement of the rattle members 50 and thus improved overall rattling of the lure 20.

The floor or baffle floor portion in the rattle chamber of the rattle body can include multiple differing slopes. In one embodiment of the lure, the sloped floor includes differently sloped areas or different degrees of slope to provide different levels of the force countering effect to a given single rattle member or group of rattle members 50, see FIGS. 6, 7 and 8. These differently sloped areas are useful because the amount of force applied to the rattle members 50 throwing them toward the rear end of the rattle chamber 44 is related to rate of acceleration of the lure such as when ripped forward by the fisherman, or the rate of back and forth swinging movement as the rattle body 24 simulates a swimming fish. Therefore in an embodiment such as in FIG. 8, a low floor 48 slope is used when the rattle members 50 are under low rearward force, and a higher or more steeply sloped floor 48 is used when the rattle members 50 are under a higher rearward force, and preferably the rattle members 50, which are preferably round shot of steel or lead, can move by rolling under the rearward pushing force (or holding force as the body moves) from the low sloped floor to the higher sloped floor simply with an acceleration of the movement of the lure, and thereby maximum rattle sound is automatically achieved in a lure in accordance with the present invention. While one slope can be used, two, three or more slopes or a curved floor (radius) can be used in a single rattle chamber.

I claim:

1. A generally snagless fishing lure comprising
   a lower body member visually resembling an aquatic creature and having a fish hook extending therefrom;
   an upper body member visually resembling a baitfish;
   a resilient wire connecting to the lower and upper body members and holding the body members in spaced relationship to one another; a bend in said wire positioned forward of the lower and upper body members providing a location at which to attach a line for pulling the fishing lure through water;
   the lower body member including sufficient weight to cause the fishing lure as a whole to sink in water and for the lower body member to position itself below the upper body member when the fishing lure is pulled through water;
   said fish hook of the lower body member positioned generally behind said wire so as to be generally protected from snagging;
   the upper body member elongate in exterior shape and connected to said wire by
   means for connecting and allowing pivoting of the upper body member in a back and forth horizontal movement; said means for connecting further including means for preventing spinning of the upper body member relative to said wire;
   the upper body member including at least one rattle chamber comprising a ceiling, a sloped floor, and at least two sidewalls in spaced relationship to one another and on opposite sides of
   the sloped floor, the upper body member further includes a triangular rattle chamber;
   at least one rattle member inside each of said at least one rattle chamber and said triangular rattle chamber for causing rattling with back and forth movement of the upper body member when the fishing lure is pulled through water; the spacing between the two sidewalls and a transverse width of said sloped floor wider than said at least one rattle member in width so as to allow back and forth traveling of said at least one rattle member transversely across said sloped floor and to impact against one of the sidewalls and then the other of the sidewalls with back and forth horizontal movement of the upper body member when the fishing lure is pulled through water, whereby rattling is created;

said sloped floor sloping upward from a lower position nearer a front end of the upper body member to a higher position nearer a back end of the upper body member for aiding in preventing said at least one rattle member from being jammed stationary in a back end of the rattle chamber by the back and forth movement of the upper body member when the fishing lure is pulled through water;

said fishing lure sans a spinning blade.

2. A generally snagless fishing lure according to claim 1 wherein said lower body includes a flexible skirt.

* * * * *